US006281878B1

(12) United States Patent
Montellese (10) Patent No.: US 6,281,878 B1
(45) Date of Patent: *Aug. 28, 2001

(54) APPARATUS AND METHOD FOR INPUTING DATA

(76) Inventor: Stephen V. R. Montellese, 2236 Teal Trace, Pittsburgh, PA (US) 15237

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,620

(22) Filed: Jan. 26, 1998

Related U.S. Application Data (63) Continuation-in-part of application No. 08/332,895, filed on Nov. 1, 1994, now abandoned.

(51) Int. Cl.[7] .................................................... G09G 5/00
(52) U.S. Cl. ......................... 345/156; 345/158; 345/168
(58) Field of Search ..................................... 345/156, 157, 345/158, 168, 175, 176

(56) References Cited

U.S. PATENT DOCUMENTS

| 4,032,237 | 6/1977 | Julesz . | |
|---|---|---|---|
| 4,468,694 | 8/1984 | Edgar . | |
| 4,757,380 | 7/1988 | Smets et al. . | |
| 4,782,328 | 11/1988 | Denlinger . | |
| 4,808,979 | 2/1989 | DeHoff et al. . | |
| 4,843,568 | 6/1989 | Krueger et al. . | |
| 4,875,034 | 10/1989 | Brokenshire . | |
| 4,893,120 | * | 1/1990 | Doering et al. ........................ 345/175 |
| 5,168,531 | 12/1992 | Sigel . | |
| 5,322,441 | 6/1994 | Lewis et al. ........................... 434/307 |
| 5,334,991 | 8/1994 | Wells et al. ................................. 345/8 |
| 5,414,413 | * | 5/1995 | Tamaru et al. ......................... 345/175 |
| 5,436,639 | 7/1995 | Arai et al. . | |
| 5,528,263 | 6/1996 | Platzker et al. . | |
| 5,605,406 | * | 2/1997 | Bowen .................................. 345/175 |
| 5,767,842 | 6/1998 | Korth . | |
| 6,008,800 | * | 12/1999 | Pryor .................................... 345/175 |

FOREIGN PATENT DOCUMENTS

| S60-69728 | 4/1985 | (JP) . | |
|---|---|---|---|
| 60-69728(A) | * | 4/1985 | (JP) ...................................... 345/175 |

OTHER PUBLICATIONS

Seymour S. Levine, Application of Three–Dimensional Vision Systems to Industrial Robotic Manufacturing and Inspection Operations, reprint from SAMPE Quarterly, Oct. 1983, pp. 137–141.

Ir. A.C.M. Gieles, Dr. W.J. Venema, Inspection of SMD's with 3–D Laser Scanning, Apr. 24–27, 1989, pp. 5–59–5–71, Chicago, Illinois.

Herbert Kaplan, 3–D Gauging With Laser Triangulation, Jul., 1994, Photonics Spectra, Laurin Publishing Co., Inc.

* cited by examiner

*Primary Examiner*—Matthew Luu
(74) *Attorney, Agent, or Firm*—Kirkpatrick & Lockhart LLP (57) ABSTRACT

An input device for detecting input with respect to a reference plane. The input device includes a light sensor positioned to sense light at an acute angle with respect to the reference plane and for generating a signal indicative of sensed light, and a circuit responsive to said light sensor for determining a position of an object with respect to the reference plane.

37 Claims, 9 Drawing Sheets

APPARATUS AND METHOD FOR INPUTING DATA

CROSS REFERENCE TO RELATED APPLICATIONS

This application is a continuation-in-part of U.S. patent application Ser. No. 08/332,895, filed Nov. 1, 1994, now abandoned.

STATEMENT REGARDING FEDERALLY SPONSORED RESEARCH OR DEVELOPMENT

Not Applicable.

BACKGROUND OF THE INVENTION

1. Field of the Invention

The present invention is directed generally to an apparatus and method for inputting data. More particularly, the present invention is directed to an apparatus and method that may be embodied in a relatively small package and still provide a full sized, or larger, input device.

2. Description of the Background

Input devices are used in almost every aspect of everyday life, including computer keyboards and mice, automatic teller machines, vehicle controls, and countless other applications. Input devices, like most things, typically have a number of moving parts. A conventional keyboard, for example, has moveable keys that open and close electrical contacts. Moving parts, unfortunately, are likely to break or malfunction before other components, particularly solid state devices. Such malfunction or breakage is even more likely to occur in conditions that are dirty or dusty. Furthermore, input devices have become a limiting factor in the size of small electronic devices, such as laptop computers and personal organizers. For example, to be efficient a keyboard input device must have keys that are spaced at least as far apart as the size of the user's finger tips. Such a large keyboard has become a limiting factor as electronic devices become smaller.

Some prior art devices have attempted to solve one or more of the above-mentioned problems. For example, touch screens can sense a user touching an image on the monitor. Such devices, however, typically require sensors and other devices in, on, or around the monitor. Furthermore, reducing the size of such an input device is limited to the size of the monitor.

Other prior art devices sense the position of a user's finger using light sensors. Those devices, however, often require light sensors to be located above and perpendicular to the keyboard, or other input device. As a result, they tend to be bulky and are not suited for use in small, hand-held devices.

Other prior art devices sense position of a user's finger with light sensors located on the surface to be monitored. In the case of a keyboard, for example, such devices typically require that sensors be located at the corners or other boundaries of the keyboard. As a result, they are bulky because the sensors must be spread out to be at least the same size as the keyboard. Such a device does not lend itself to use in a small, hand held device or in providing a full sized keyboard, or other input device.

As a result, the need exists for an input device that is large enough to be used efficiently, and which can be contained within a small package, such as an electronic device, like as a laptop computer or a personal organizer. The need also exists for an input device that is not susceptible to failure caused by particulate matter, such as dirt and dust.

BRIEF SUMMARY OF THE INVENTION

The present invention includes an input device for detecting input with respect to a reference plane. The input device includes a light sensor positioned to sense light at an acute angle with respect to the reference plane and for generating a signal indicative of sensed light, and a circuit responsive to said light sensor for determining a position of an object with respect to the reference plane. The portion of the object with respect to the reference plane can then be used to produce an input signal of the type that is now produced by a mechanical device. That input signal is input to an electronic device, such as a portable computer or a personal organizer.

The present invention also includes a method of determining an input. The method includes providing a source of light, sensing light at an acute angle with respect to a reference plane, generating at least one signal indicative of sensed light, determining a position of an object with respect to the reference plane from the at least one signal indicative of the sensed light, and determining an input from the position of the object with respect to the reference plane.

The present invention overcomes deficiencies in the prior art by providing for an input device that is compact and that allows for a full sized keyboard or other input means to be provided. Unlike prior art devices that require sensors to be located directly above the area to be sensed or at the boundaries of the area to be sensed, the present invention allows the input device to be self contained and remote from the area to be sensed.

Those and other advantages and benefits of the present invention will become apparent from the description of the preferred embodiments hereinbelow.

BRIEF DESCRIPTION OF THE SEVERAL VIEWS OF THE DRAWING

For the present invention to be clearly understood and readily practiced, the present invention will be described in conjunction with the following-figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 1:
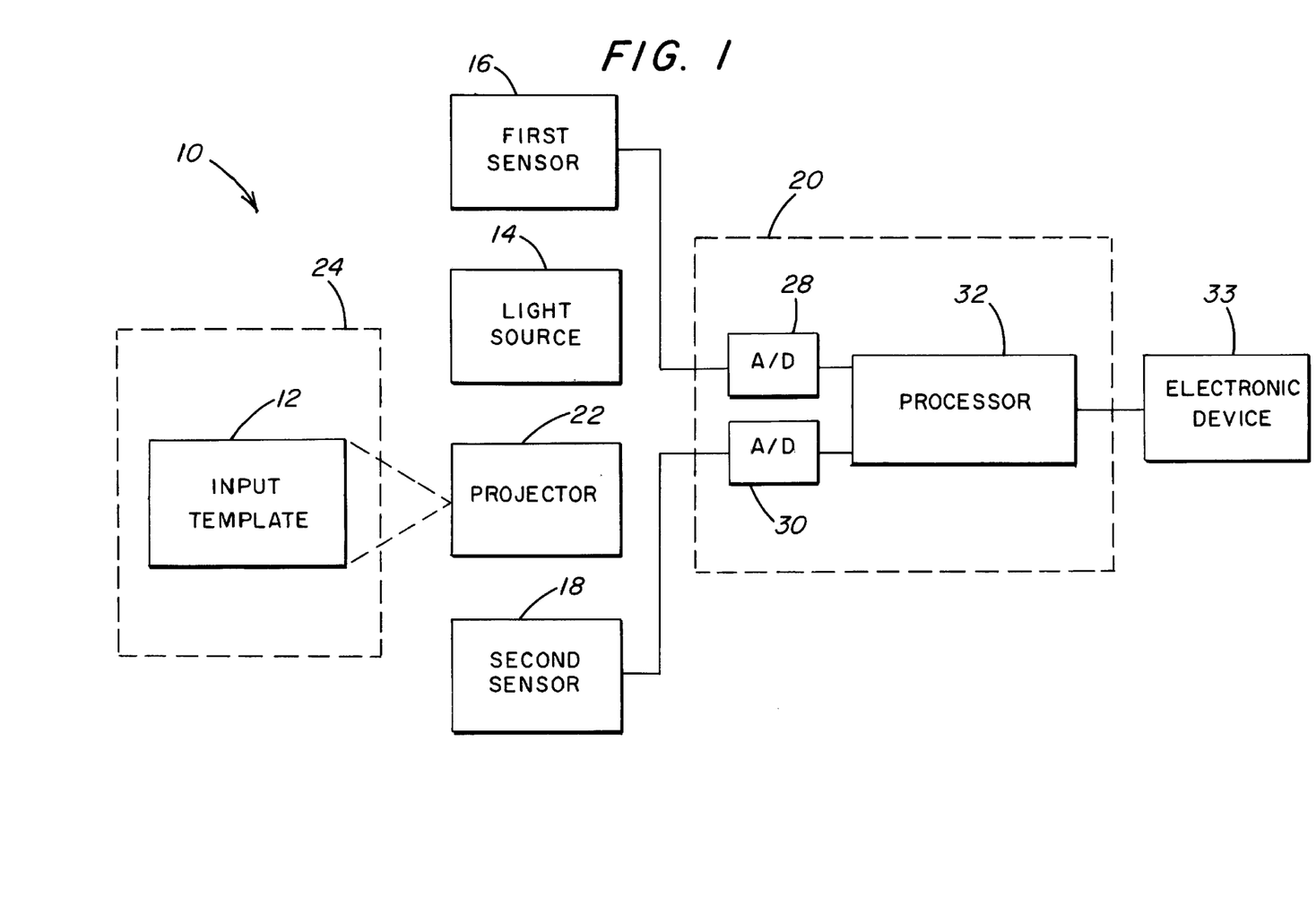
FIG. 1 is a block diagram illustrating an input device constructed in accordance with the present invention.

FIG. 1 is a block diagram illustrating an input device 10 constructed in accordance with the present invention. The input device 10 includes an input template 12, a light source 14, a first light sensor 16, a second light sensor 18, and a circuit 20.

The input template 12 facilitates using the input device 10 and may be an image of an input device, such as a keyboard or a pointer. The input template 12 may be a physical template, such as a surface with an image of an input device printed thereon. For example, the input template 12 may be a piece of paper or a piece of plastic with an image of a keyboard printed thereon. The input template 12 may also be formed from light projected onto a solid surface. For example, a projector 22 may project an image of the input template 12 onto a solid surface, such as a desktop. The projector 22 may be, for example, a slide projector or a laser projector. The projector 22 may also provide several different input templates 12, either simultaneously or individually. For example, a keyboard and pointer may initially be provided simultaneously. During other functions, however, the input template 12 may take other forms, such as a button panel, a keypad, and a CAD template. In addition, the projector 22 may provide custom input templates 12. The input template 12 may also be formed from other than a projector 22, such as being formed from a holographic image or from a spherical reflection. The input template 12 may even be eliminated, as described hereinbelow.

The input template 12 is located in a reference plane 24. The reference plane 24 is defined by the input device 10 and is used as a reference for determining input from a user. For example, if the input device 12 is acting as a keyboard, the reference 24 plane may be thought of as an imaginary keyboard. The user's motions are monitored with reference to the reference plane 24 to determine what keys on the keyboard are being selected. The reference plane 24 may be thought of as being further defined into keys on the keyboard, with each key having a position on the reference plane 24 so that motions from the user can be translated into characters selected from the keyboard.

The light source 14 provides light adjacent to the input template 12. The light source 14 may provide any of many types of light, including visible light, coherent light, ultraviolet light, and infrared light. The light source 14 may be an incandescent lamp, a fluorescent lamp, or a laser. The light source 14 need not be a mechanical part of the input device 10, because the input device 10 may utilize ambient light from the surroundings or infrared light produced by a person's body. When the input device 10 is used on a top of a flat surface, the light source 14 will typically provide light above the input template 12. The input device 10, however, has many applications and it need not be used on top of a flat surface. For example, the input device 10 may be mounted vertically on a wall, such as an automatic teller machine, a control panel, or some other input device. In such embodiment, the light source 14 will provide light adjacent to the input template 12, and from the perspective of a user, the light source 14 provides light in front of the input template 12. Alternatively, if the input device 10 is mounted above the user, such as in the roof of an automobile or an airplane, the light source 14 will provide light adjacent to and below the input template 12. In each of those embodiments, however, the light is provided adjacent to the input template 12.

The first and second light sensors 16, 18 are positioned to sense light at an acute angle with respect to the input template 12, and to generate signals indicative of the sensed light. The first and second light sensors 16, 18 may be any of many types of light sensors. For example, the first and second light sensors 16, 18 may be two dimensional matrix type light sensors and may also be one dimensional array type light sensors. Furthermore, the first and second light sensors 16, 18 may sense any of many types of light, such as visible light, coherent light, ultraviolet light, and infrared light. The first and second light sensors 16, 18 may also be selected or tuned to be particularly sensitive to a predetermined type of light, such as a particular frequency of light produced by the light source 14, or infrared light produced by a person's finger. As discussed hereinbelow, the input device 10 may also utilize only one of the first and second light sensors 16, 18 and, alternatively, may utilize more than two light sensors.

The circuit 20 is responsive to the first and second light sensors 16, 18 and determines a position of an object with respect to the reference plane 24. The circuit 20 may include analog-to-digital converters 28, 30 for converting analog signals from first and second light sensors 16, 18 into digital signals for use by a processor 32. The processor 32 may determine the position of an object adjacent to the input template 12 by using techniques such as binocular disparity and triangulation. The processor 32 may apply image recognition techniques to distinguish between objects used to input data and background objects. Software for determining the position of an object and for image recognition is commercially available and may be obtained from Industrial Perception Systems, Inc., Allison Park, Pa. The circuit 20 may provide an output signal to an electronic device 33, such as a portable computer or a personal organizer. The output signal is indicative of input selected by the user.

Figure 2:
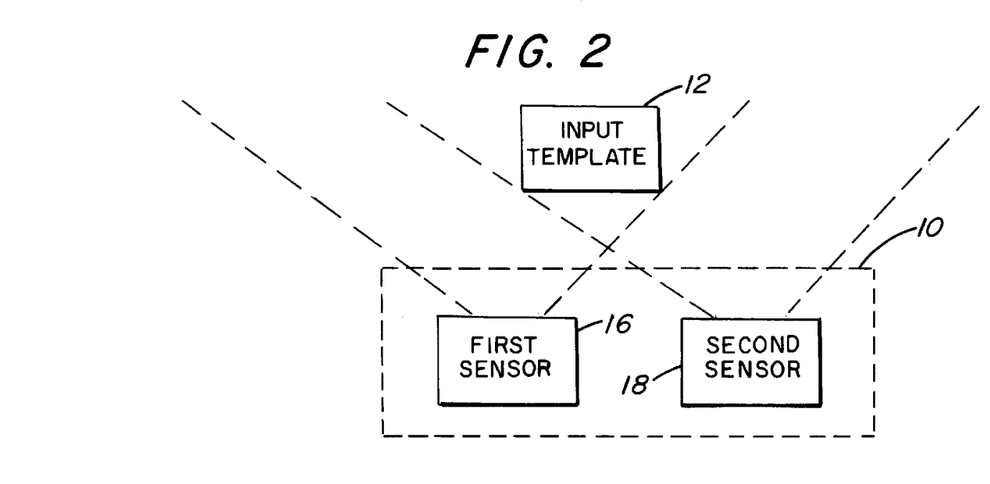
FIG. 2 is a top plan schematic view of the input device illustrating the orientation of the first and second sensors.

FIG. 2 is a top plan schematic view of the input device 10 illustrating the orientation of the first and second sensors 16, 18. In contrast to some prior art devices, the sensors 16, 18 in the present invention may be located remote from the area to be sensed, and may be facing in generally the same direction. Because the first and second sensors 16, 18 may be located remote from the area to be sensed, the input device 10 may be a small, compact device, which is ideal in applications such as personal organizers and laptop computers. For example, the present invention may be utilized in a laptop computer which is significantly smaller than a keyboard, but which provides the user with a full size keyboard and mouse.

Figure 3:
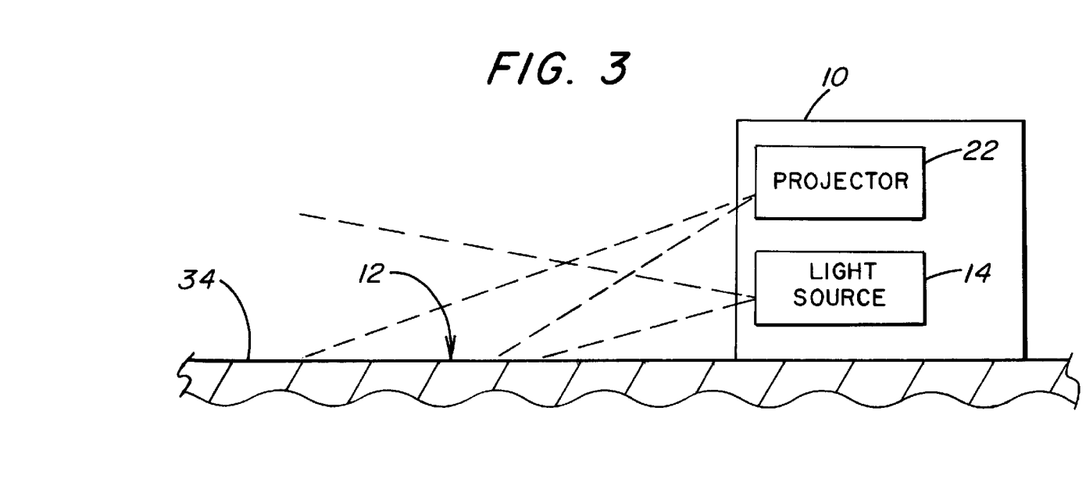
FIG. 3 is a schematic representation of a projector and a light source oriented in an input device constructed in accordance with the present invention.

FIG. 3 is a schematic representation of the projector 22 and the light source 14 within an input device 10 constructed in accordance with the present invention. The input device 10 may be placed on a solid surface 34. The projector 22 may be placed high in the input device 10 so as to increase the angle at which the projector projects the input template 12 onto the surface 34. The light source 14 may be placed low in the input device 10 so as to provide light adjacent to the input template 12 near the surface 34, and also to reduce "washout" of the projected input template 12 by reducing the amount of light incident on the surface 34.

Figure 4:
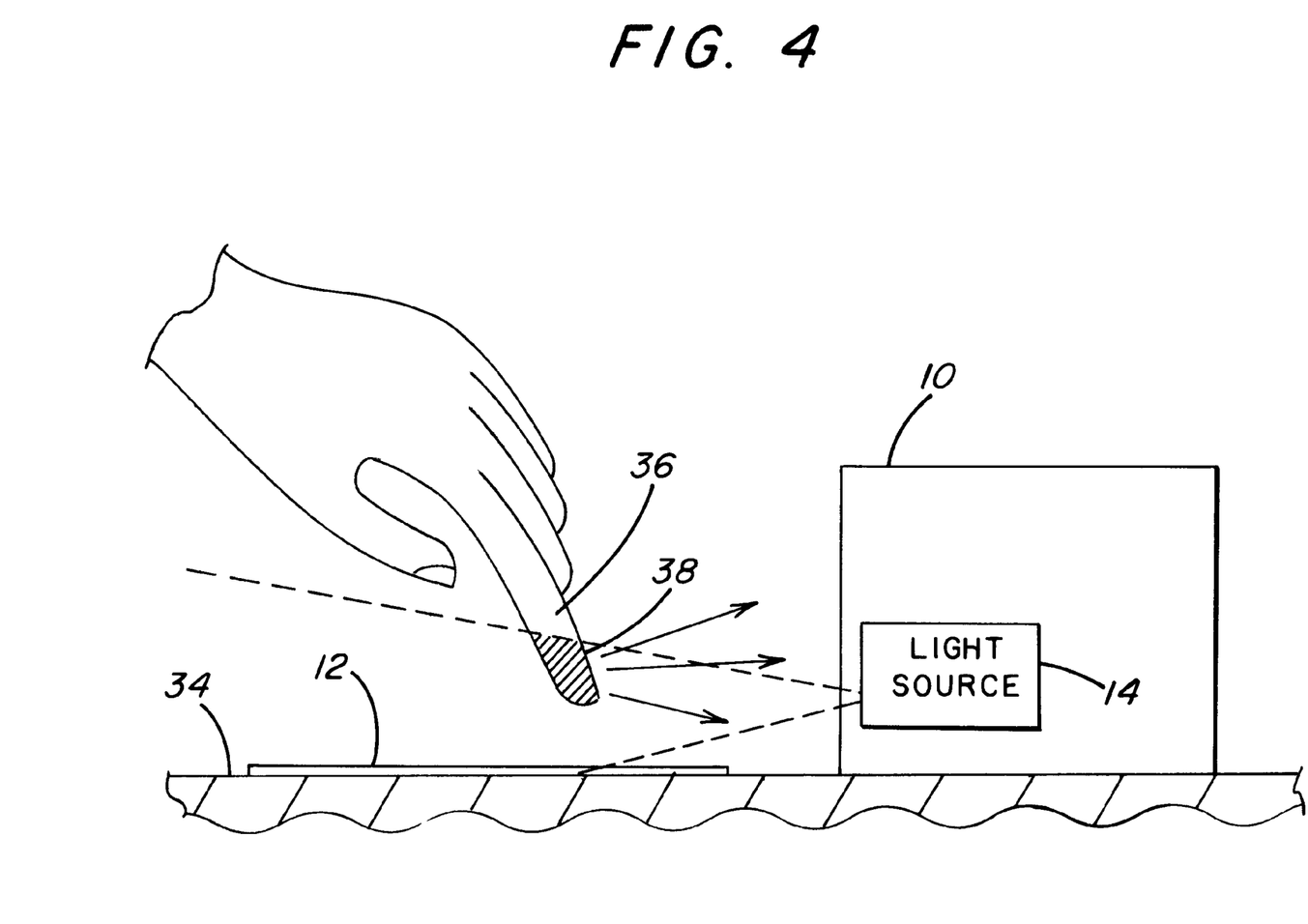
FIG. 4 is a perspective view of an input device sensing a user's finger.

FIG. 4 is a perspective view of an input device 10 sensing input from a user's finger 36. A portion 38 of the user's finger 36 is illuminated by the light source 14 as the user's finger 36 approaches the input template 12. Light is reflected from the illuminated portion 38 of the user's finger 36 and is sensed by the first and second light sensors 16, 18 (illustrated in FIGS. 1 and 2). The light sensors 16, 18 (illustrated in FIGS. 1 and 2) are positioned to sense light at an acute angle with respect to the input template 12. The precise angle of the light from the user's finger 36 depends on the location of the first and second light sensors 16, 18 (illustrated in FIGS. 1 and 2) in the input device 10 and the distance of the input device 10 from the user's finger 36.

Figure 5:
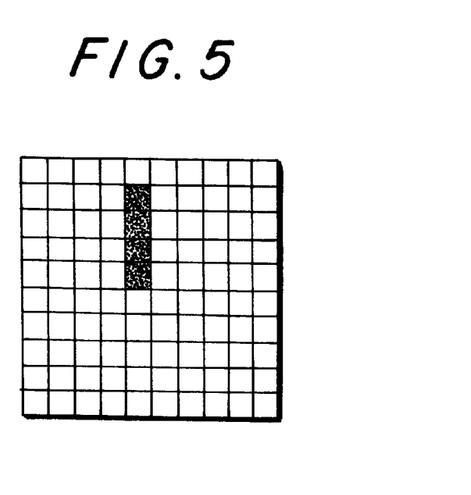
FIGS. 5–8 are graphical representations of light sensed by two dimensional matrix type sensors.
Figure 6:
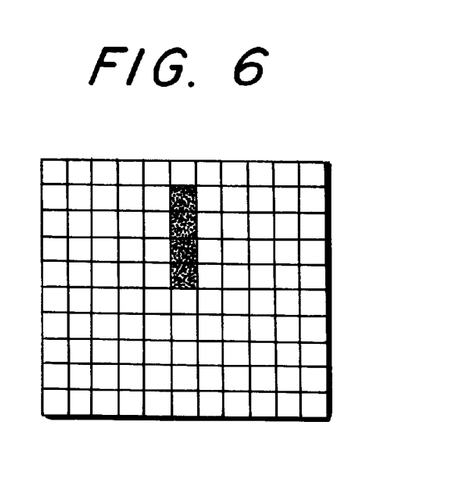
Figure 7:
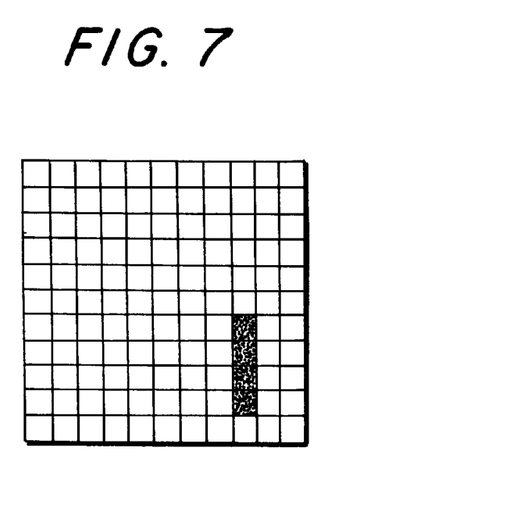
Figure 8:
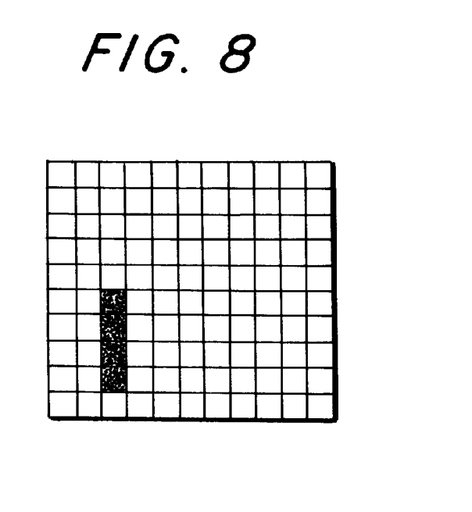

FIGS. 5 and 6 are graphical representations of light sensed by two two-dimensional matrix type sensors, such as may be used for first and second sensors 16,18. A two-dimensional matrix type sensor is a type of light sensor used in video cameras and may be graphically represented as a two-dimensional grid of light sensors. Light sensed by the two-dimensional matrix sensor may be represented as a two-dimensional grid of pixels. The pixels darkened in FIGS. 5 and 6 represent the reflected light from the user's finger 36 illustrated in FIG. 4 and sensed by the first and second sensors 16, 18, respectively. The position of the user's finger 36 may be determined by applying binocular disparity techniques and/or triangulation techniques to the data from the first and second light sensors 16, 18. The relative left and right position of the user's finger 36 may be determined from the location of the sensed light in the pixel matrix. For example, if the object appears on the left side of the sensors 16, 18, then the object is to the left of the sensors 16, 18. If the object is sensed on the right side of the sensors 16, then the object is to the right. The distance of the user's finger 36 may be determined from differences in the images sensed by the sensors. For example, the farther the user's finger 36 is from the sensors, the more similar the images from the first and second light sensors 16, 18 will become. In contrast, as the user's finger 36 approaches the first and second sensors 16, 18, the images will become more and more dissimilar. For example, if the user's finger 36 is close to the first and second sensors 16, 18 and is generally near the center of the input template 12, one image will appear on the right side of one sensor and a different image will appear on the left side of the other sensor, as illustrated in FIGS. 7 and 8, respectively.

The input device 10 may determine when a user intends to select an item from the input template 12, as distinguished from when a user does not intend to make a selection, by the distance between the user's finger 36 and the input template 12. For example, the input device 10 may conclude that a user desires to select an item below the user's finger when the user's finger 36 is less than one inch from the input template 12. The input device 10 may be calibrated to determine distance between a user's finger 36 and the input template 12.

Figure 9:
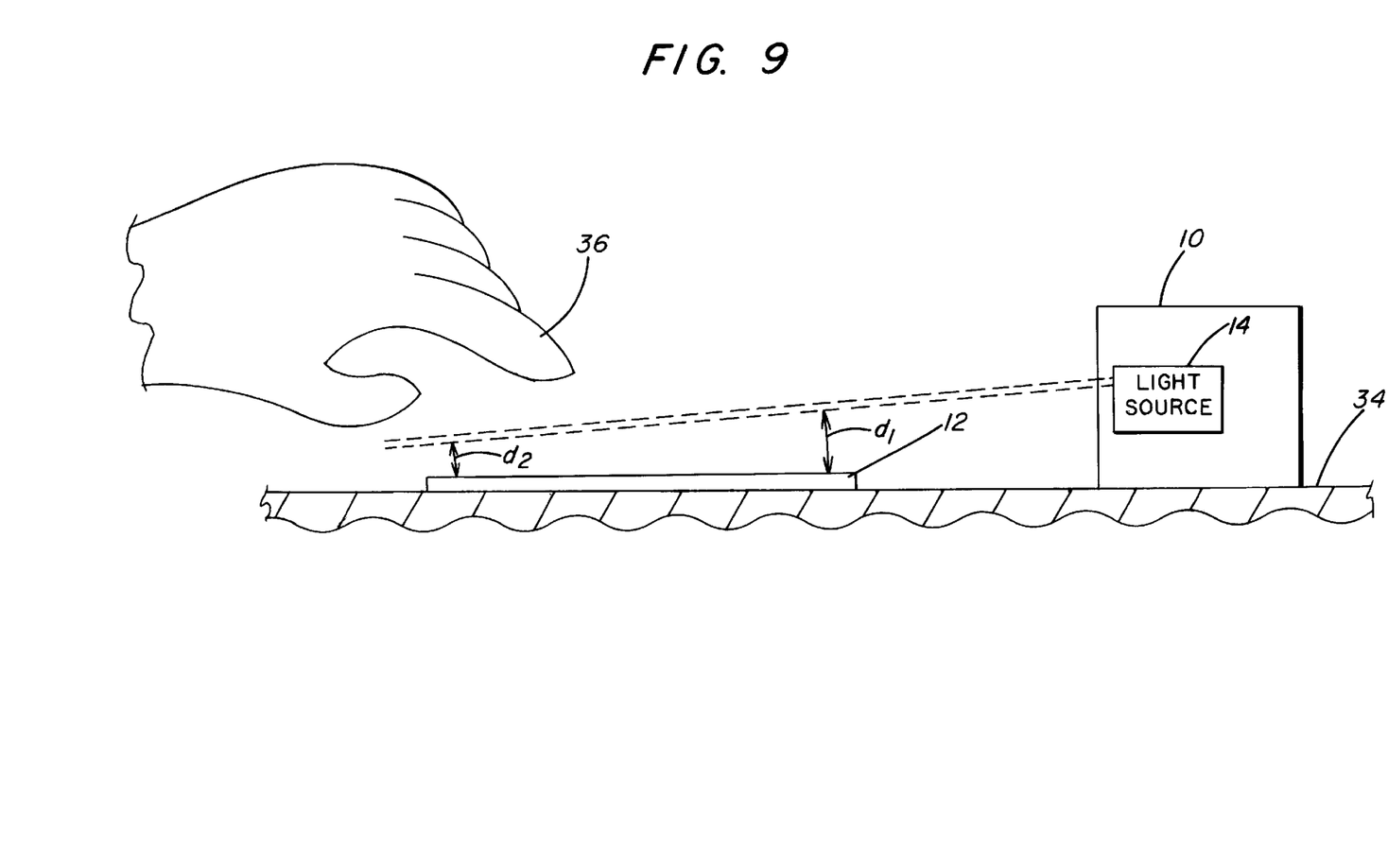
FIG. 9 is a combination side plan view and block diagram illustrating another embodiment of the present invention wherein the light source produces a plane of light adjacent to the input template.

FIG. 9 is a combination side plan view and block diagram illustrating another embodiment of the present invention wherein the light source 14 produces a plane of light adjacent to the input template 12. In that embodiment, the plane of light defines a distance above the input template 12 where an object must be placed to select an item on the input template 12. That is because if the user's finger 36 is above the plane of light, the finger 36 will not reflect light back towards the first and second sensors 16, 18. In contrast, once the finger 36 breaks the plane of light, light will be reflected back to the light sensors 16, 18.

The light source 14 may be positioned so that the plane of light is sloped and its height is not constant above the input template 12. As illustrated in FIG. 9, the plane of light may be one distance $d_1$ above the template 12 at a point near the light source 14, and the plane of light may be another lesser distance $d_2$ above the input template 12 away from the light source 14. The converse, of course, may also be implemented. Such non-uniform height of the plane of light may be used to facilitate sensing distance. For example, if the user's finger 36 is close to the light source 14, it will reflect light towards the top of a two-dimensional matrix type sensor. Conversely, if the user's finger 36 is far from the light source 14, it will reflect light towards the bottom of a two-dimensional matrix type sensor.

Figure 10:
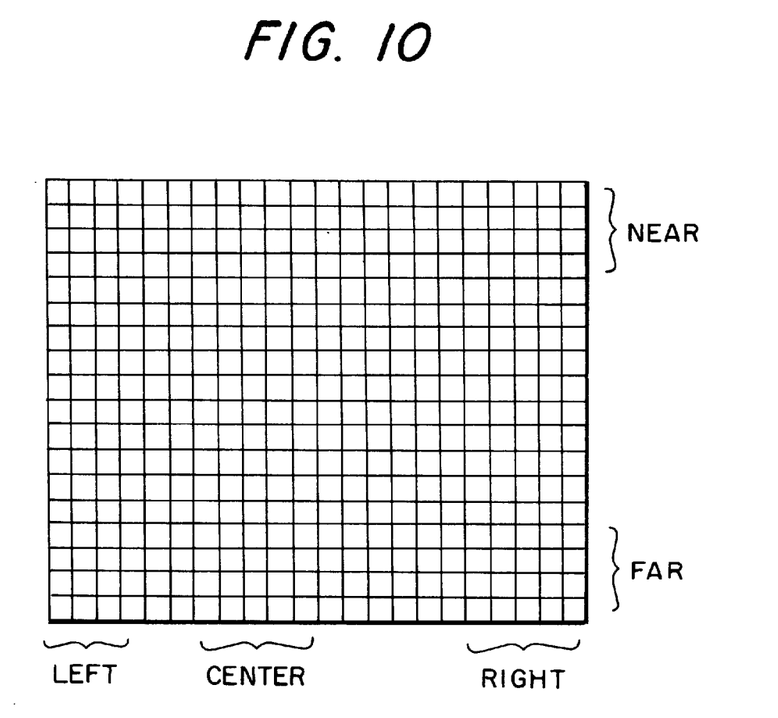
FIG. 10 is a graphical representation of a two dimensional matrix type sensor illustrating how an image from a singe two dimensional matrix type sensor may be used to determine position of an object adjacent to an input template.

FIG. 10 is a graphical representation of a two-dimensional matrix type sensor illustrating how an image from a singe two-dimensional matrix type sensor may be used to determine position of an object adjacent to an input template. The position of an object may be determined from the portion of the two-dimensional matrix type sensor that detects the reflected light. For example, as with the embodiments described hereinabove, the direction of the object relative to the sensor may be determined from the horizontal position of light reflected from the object. For example, an object located to the left of the sensor will reflect light towards the left side of the sensor. An object located to the right of the sensor will reflect light towards the right side of the sensor. The distance from the sensor to the object may be determined by the vertical position of light reflected from the object. For example, in the embodiment illustrated in FIG. 9, an object near the sensor will result in light being reflected towards the top of the sensor. Conversely, an object farther away from the sensor will result in light being reflected closer to the bottom of the sensor. The slope of the plane of light and the resolution of the sensor will effect the depth sensitivity of the input device 10. Of course, if the slope of the plane of light illustrated in FIG. 9 is inverted, the depth perception of the sensor will be reversed.

Figure 11:
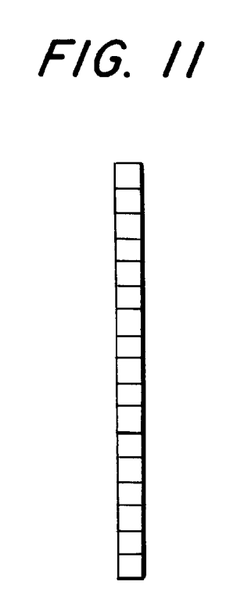
FIGS. 11 and 12 illustrate one dimensional array type sensors that may be used in place of the two dimensional matrix type sensor illustrated in FIG. 10.
Figure 12:
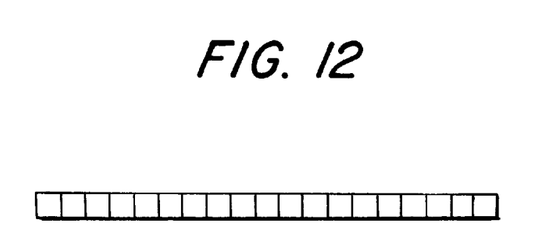

FIGS. 11 and 12 illustrate one-dimensional array type sensors that maybe used in place of the two-dimensional matrix type sensor illustrated in FIG. 10. One-dimensional array type sensors are similar to two-dimensional matrix type sensors, except that they sense light in only one dimension. As a result, a one-dimensional array type sensor may be used to determine horizontal position of sensed light, but not vertical position of the sensed light. A pair of one-dimensional array type sensors may be oriented perpendicular to each other, so that, collectively, they may be used to determine a position of an object, such as a user's finger 36, in a similar manner to that described with respect to FIG. 10. For example, FIG. 11 illustrates a vertically oriented one-dimensional array type sensor that may be used to determine the depth component of the position of the user's finger 36. FIG. 12 illustrates a horizontally oriented one-dimensional sensor that may be used to determine the left and right position of the user's finger 36.

The present invention may also include a calibration method as described hereinbelow. The calibration method may be used, for example, when a physical template, such as a paper or plastic image of an input device, is used. In such embodiment, the input device 10 may prompt the user for sample input. For example, in a case of a keyboard input template 12, the input device 10 may prompt the user to type several keys. The input sensed by the input device 10 is used to determine the location of the input template 12. For example, the input device 10 may prompt the user to type the words "the quick brown fox" in order to determine where the user has placed the input template 12. Alternatively, in the case of a pointer, such as a mouse, the input device 10 may prompt the user to indicate the boundaries of the pointer's range of motion. From that information, the input device 10 may normalize input from the input template 12.

In an alternative embodiment, the input device 10 may omit an input template 12. For example, a good typist may not need an image of a keyboard to enter data. In such a case, an input device 10 may prompt a user for sample input to determine where an input template 12 would be located if the user were utilizing an input template 12. Furthermore for simple input templates, such as an input template 12 having only a small number of inputs, an input template 12 may not be needed by any user. For example, an input template 12 having only two inputs can, under most circumstances, be reliably used by the user without an input template. In that example, one input may be selected by the user's finger 36 placed generally to the left side of the input device 10, while the other of the inputs may be selected by the user's finger 36 placed generally to the right side of the input device 10. If the input template 12 is eliminated, the reference plane 22 still exists. For example, one or more light sensors 16, 18 are positioned to sense light reflected at an acute angle with respect to the reference plane 22, even if the user is not using an input template 12.

Figure 13:
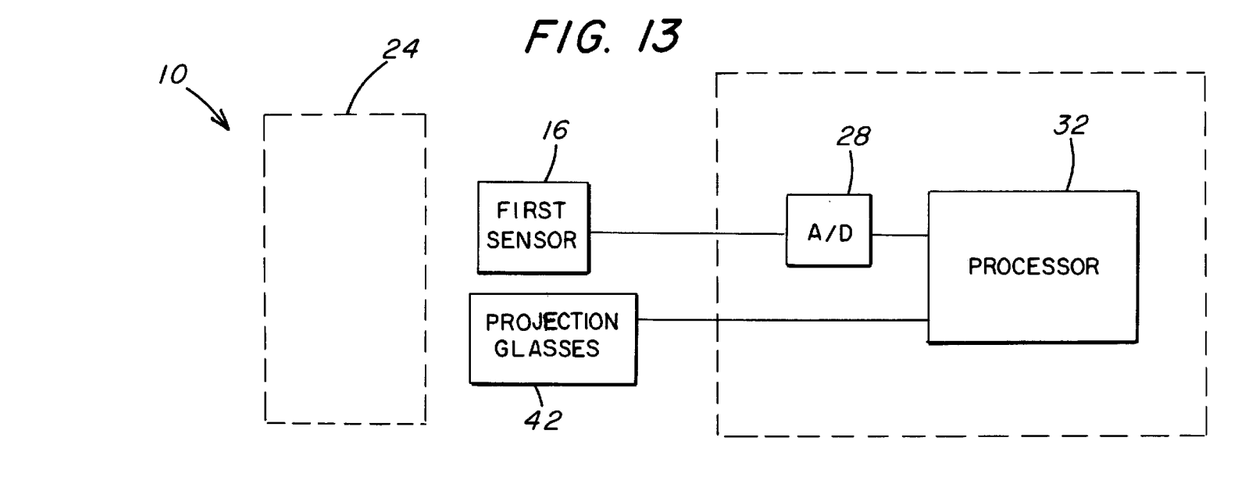
FIG. 13 is a block diagram illustrating an alternative embodiment of the present invention including projection glasses, such as may be used in virtual reality applications, to provide the user with an image of an input template.

FIG. 13 is a block diagram illustrating an alternative embodiment of the present invention including projection glasses 42, such as may be used in virtual reality applications, to provide the user with an image of an input template 12. That embodiment eliminates the input template 12. The glasses 42 may be controlled by the processor 32. The glasses 42 may be position sensitive so that the processor 32 knows where and at what angle the glasses 42 are, thereby allowing the image created by the glasses 42 to appear to remain in one place relative to the user, even when the user's head moves. The glasses 42 may allow the user to see the surrounding reality as well as an image of an input template 12. In that embodiment, the input template 12 may remain in the same location in the user's field of vision, even when the user's head moves. Alternatively, if the glasses 42 are position sensitive, the input template 12 may remain in one location in the reality, such as on a desktop, when the user's head moves. The embodiment illustrated in FIG. 13 uses only one sensor 16 and no light source 14 or projector 22, although as described hereinabove, more sensors, a light source 14, and a projector 22 may be used.

Figure 14:
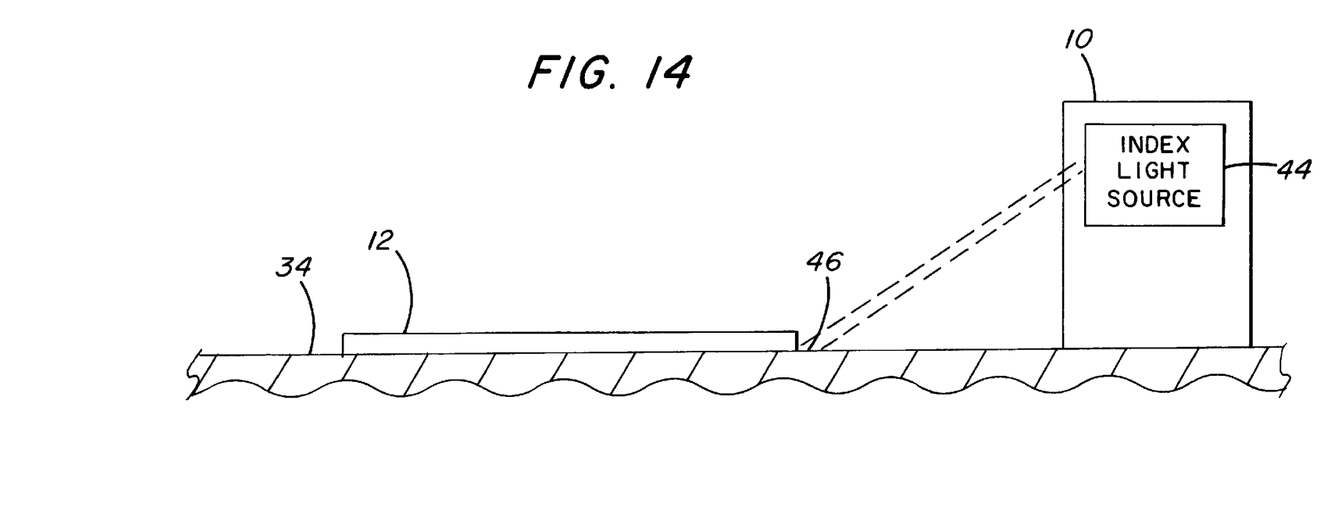
FIG. 14 illustrates an alternative embodiment wherein an index light source provides an index mark for aligning an input template.

FIG. 14 illustrates an alternative embodiment wherein an index light source 44 is provided. The index light source 44 is used to provide one or more index marks 46 on the surface 34. The index marks 46 may be used by a user to properly align a physical input template 12. In that embodiment, there may be no need for a calibration step to determine the precise location of the physical input template 12.

Figure 15:
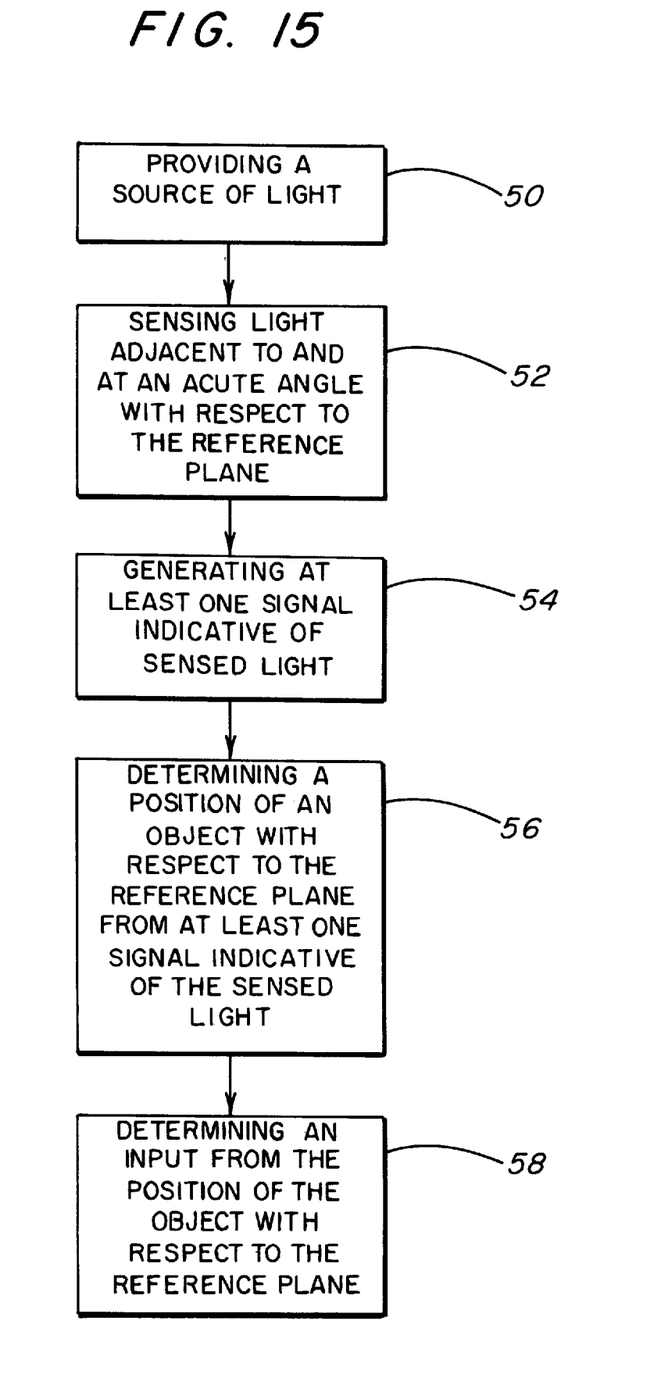
FIG. 15 is a block diagram illustrating a method of detecting an input with respect to a reference plane.

FIG. 15 is a block diagram illustrating a method of detecting an input with respect to a reference plane. The method includes providing a source of light 50, sensing light at an acute angle with respect to the reference plane 52, generating at least one signal indicative of sensed light 54, determining a position of an object with respect to the reference plane from the at least one signal indicative of the sensed light 56, and determining an input from the position of the object with respect to the reference plane 58. The method may include providing an input template in the reference plane, as in the description of the device provided hereinabove.

Figure 16:
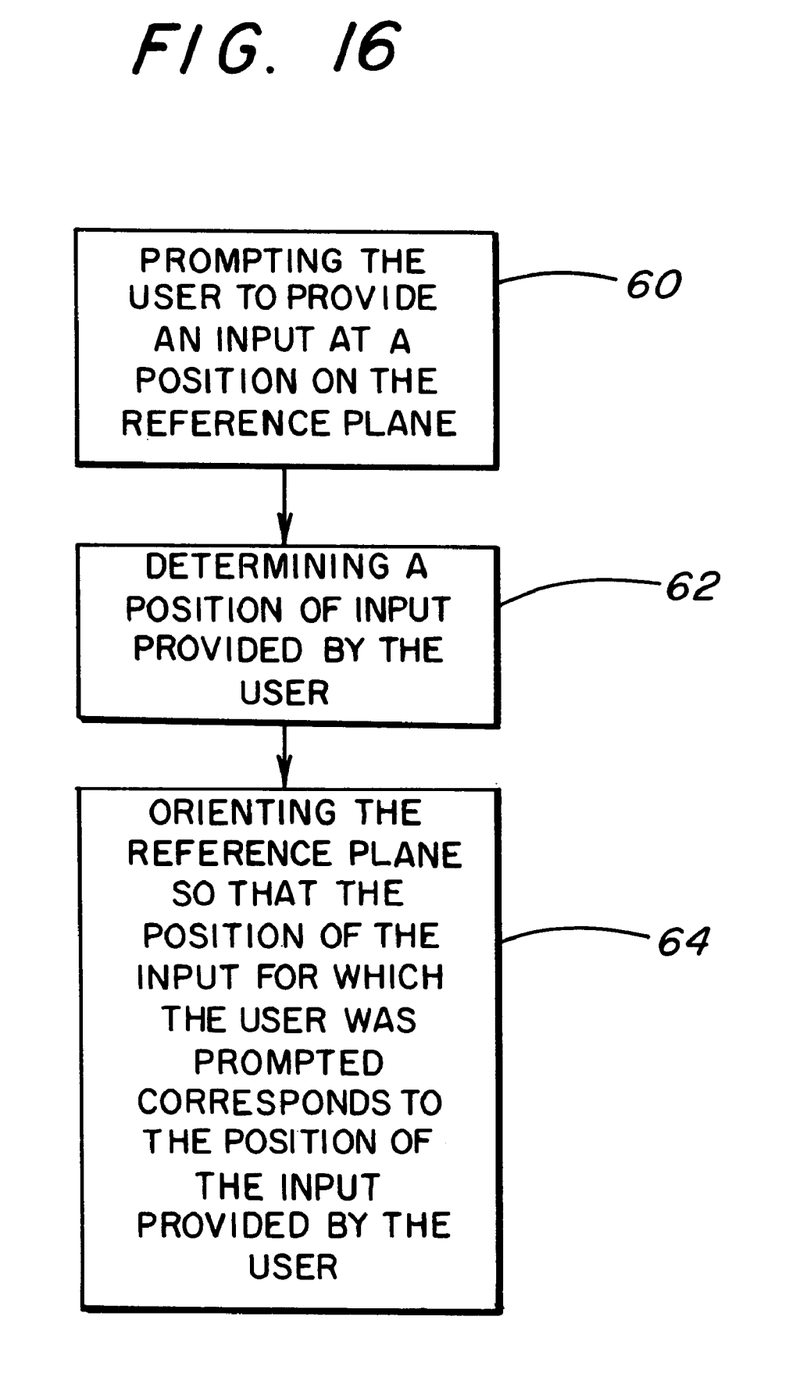
FIG. 16 is a block diagram illustrating a method of calibrating the input device.

FIG. 16 is a block diagram illustrating a method of calibrating the input device. The method includes prompting the user to provide input at a position on the reference plane 60, determining a position for the input provided by the user 62, and orienting the reference plane so that the position of the input for which the user was prompted corresponds to the position of the input provided by the user 64. An input template may be used by placing it in the reference plane and performing the calibration method. Regardless of whether an input template is used, the reference plane is defined as an input device. The reference plane may be defined as any of many input devices, such as a keyboard or a pointer. For example, if the reference plane is defined as a keyboard, the calibration method may include prompting the user to enter a character on the keyboard and orienting the reference plane so that the position of the character for which the user was prompted corresponds to the position of the input provided by the user. The calibration method may be performed with more than one input from a user, so that the method includes prompting the user for a plurality of inputs (each having a position on the reference plane), determining a position for each input provided by the user, and orienting the reference plane so that the position of each of the inputs for which the user was prompted corresponds to the positions of each of the inputs provided by the user. Determining a position of one or more inputs provided by the user may be accomplished in the same manner that an input is determined in normal operation. In other words, determining may include providing a source of light, sensing light at an acute angle with respect to the reference plane, generating at least one signal indicative of sensed light, and determining a position of an object with respect to the reference plane from the at least one signal indicative of the sensed light.

Those of ordinary skill in the art will recognize that many modifications and variations of the present invention may be implemented. For example, the invention was described with respect to a user's finger 36 being used to select items on the input template 12, although other things, such as pencils and pens, may be used to select items on the input template 12. As another example, the light source 14 may be eliminated. Depth of an object may be determined by the object's size. An object that is close to the sensor will appear larger than an object that is farther away. Calibration of the input device 10, such as described hereinabove, may be used to determine the size of the object at various locations. For example, prior to inputting data, the user may be prompted to select an input near the top of the input template 12, and then to select an item near the body of the input template 12. From that information, the input device 10 may interpolate for positions in between. The foregoing description and the following claims are intended to cover all such modifications and variations.

What is claimed is:

1. An input device for detecting input with respect to a reference plane, comprising:
   a light source providing a plane of light adjacent to the reference plane, wherein the light source does not project an input template onto the reference plane;
   a light sensor positioned to sense light reflected from the plane of light, the sensor at an acute angle with respect to the reference plane, and generating a signal indicative of sensed light; and a circuit responsive to said light sensor for determining a position of an object with respect to the reference plane.

2. The input device of claim 1, further comprising an input template in the reference plane.

3. The input device of claim 2, wherein said template is a flat surface having a template of an input device printed thereon.

4. The input device of claim 2, wherein said template is an image of an input device selected from a group consisting of a keyboard and a pointer.

5. The input device of claim 2, wherein said template is selected from a group consisting of light projected onto a solid surface, a holographic image, and a spherical reflection.

6. The input device of claim 2, further comprising a projector positioned to project an image of said template.

7. The input device of claim 1, wherein said sensor is selected from a group consisting of a two-dimensional matrix type light sensor and a one dimensional array type light sensor.

8. The input device of claim 1, wherein said sensor senses light selected from a group consisting of visible light, coherent light, ultraviolet light, and infrared light.

9. The input device of claim 1, further comprising at least one additional light sensor.

10. The input device of claim 9, wherein said sensor and said at least one additional sensor are oriented in the same direction.

11. The input device of claim 1, wherein said sensor is remote from a position at which input is to be detected relative to the reference plane.

12. The device of claim 1, wherein said circuit determines position of an object by performing an operation selected from a group consisting of binocular disparity and triangulation.

13. The input device of claim 1, wherein said light source produces light selected from a group consisting of visible light, coherent light, ultraviolet light, and infrared light.

14. The device of claim 1 wherein said light source provides a plane of light that is at an acute angle with respect to said reference plane.

15. The device of claim 1 wherein said light source provides a plane of light that is parallel to said reference plane.

16. The device of claim 1, wherein said light source is selected from a group consisting of an incandescent lamp, a fluorescent lamp, and a laser.

17. The device of claim 1, wherein said light source and said sensor are oriented in the same direction.

18. The device of claim 1, further comprising projection glasses responsive to said circuit.

19. The device of claim 18, wherein said projection glasses project an image of an input template in the reference plane.

20. The device of claim 1, further comprising an index light source for projecting onto a surface at least one index mark to align an input template.

21. The input device of claim 1, further comprising an electronic device responsive to said circuit.

22. The input device of claim 1, wherein said circuit produce an output signal indicative of an input provided by a user, and further comprising an electronic device responsive to the output signal from said circuit.

23. In combination, an input device for detecting input with respect to a reference plane, and an electronic device, comprising:

a light source providing a plane of light adjacent to the reference plane, wherein the light source does not project an input template onto the reference plane;

a light sensor positioned to sense light reflected from the plane of light, the sensor at an acute angle with respect to the reference plane, and generating a signal indicative of sensed light;

a circuit responsive to said light sensor for determining a position of an object with respect to the reference plane and producing an output signal indicative of the input; and an electronic device responsive to the output signal from said circuit.

24. A method of determining an input with respect to a reference plane, comprising:

providing a source of planar light adjacent to the reference plane, wherein the source of planar light does not project an input template onto the reference plane;

sensing light reflected from the planar light, the sensing at an acute angle with respect to the reference plane;

generating at least one signal indicative of sensed light;

determining a position of an object with respect to the reference plane from the at least one signal indicative of the sensed light; and determining an input from the position of the object with respect to the reference plane.

25. The method of claim 24, further comprising providing an input template in the reference plane.

26. The method of claim 24, further comprising calibrating the input device.

27. The method of claim 26, wherein calibrating includes:

prompting the user to provide input at a position on the reference plane;

determining a position of input provided by the user; and orienting the reference plane so that the position of the input for which the user was prompted corresponds to the position of the input provided by the user.

28. The method of claim 27, wherein the reference plane is defined as an input device selected from a group consisting of a keyboard and a pointer.

29. The method of claim 27, wherein:

the reference plane is defined as a keyboard;

prompting includes prompting the user to enter a character on the keyboard; and orienting includes orienting the reference plane so that the position of the character for which the user was prompted corresponds to the position of the input provided by the user.

30. The method of claim 27, wherein:

prompting includes prompting the user for a plurality of inputs, each having a position on the reference plane;

determining includes determining a position for each input provided by the user; and orienting includes orienting the reference plane so that the position of each of the inputs for which the user was prompted corresponds to the position of each of the inputs provided by the user.

31. The method of claim 30, wherein determining includes:

providing a source of light;

sensing light at an acute angle with respect to the reference plane;

generating at least one signal indicative of sensed light; and determining a position of an object with respect to the reference plane from the at least one signal indicative of the sensed light.

32. The method of claim 24, wherein determining a position of an object includes performing an operation selected from a group consisting of binocular disparity and triangulation.

33. The method of claim 24, further comprising producing an output signal indicative of the input.

34. The method of claim 33, further comprising providing an electronic device responsive to the output signal.

35. An input device for detecting input with respect to a reference plane, comprising:
- a light source providing a plane of light, the light source being located remote from a position at which input is to be detected relative to the reference plane, wherein the light source does not project an input template onto the reference plane;
- a light sensor positioned to sense light reflected from the plane of light, the sensor at an acute angle with respect to the reference plane, and generating a signal indicative of sensed light, the light sensor being located remote from a position at which input is to be detected relative to the reference plane; and
- a circuit responsive to said light sensor for determining a position of an object with respect to the reference plane.

36. In combination, an input device for detecting input with respect to a reference plane, and an electronic device, comprising:
- a light source providing a plane of light, the light source being located remote from a position at which input is to be detected relative to the reference plane, wherein the light source does not project an input template onto the reference plane;
- a light sensor positioned to sense light reflected from the plane of light, the sensor at an acute angle with respect to the reference plane, and generating a signal indicative of sensed light, the light sensor being located remote from a position at which input is to be detected relative to the reference plane;
- a circuit responsive to said light sensor for determining a position of an object with respect to the reference plane and producing an output signal indicative of the input; and
- an electronic device responsive to the output signal from said circuit.

37. A method of determining an input with respect to a reference plane, comprising:
- providing a source of planar light, the source of planar being located remote from a position at which input is to be detected relative to the reference plane, wherein the source of planar light does not project an input template onto the reference plane;
- sensing light reflected from the planar light, the sensing at an acute angle with respect to the reference plane, the light being sensed remote from a position at which input is to be detected relative to the reference plane;
- generating at least one signal indicative of sensed light;
- determining a position of an object with respect to the reference plane from the at least one signal indicative of the sensed light; and
- determining an input from the position of the object with respect to the reference plane.

* * * * *